Figure 1:
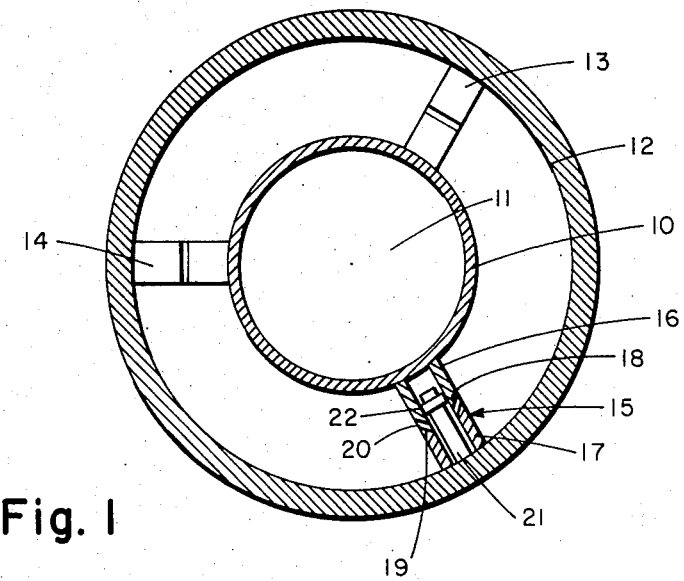

United States Patent [19]

Gabron et al.

[11] 3,814,361
[45] June 4, 1974

[54] DUAL-MODE CRYOGENIC SUPPORT SYSTEM

[75] Inventors: Frank Gabron; John E. McCullough, both of Carlisle, Mass.

[73] Assignee: Arthur D. Little, Inc., Cambridge, Mass.

[22] Filed: Sept. 29, 1972

[21] Appl. No.: 293,665

[52] U.S. Cl.................. 248/146, 248/DIG. 1, 62/45
[51] Int. Cl............................................. F22b 37/24
[58] Field of Search ........ 248/DIG. 1, 55, 200, 309, 248/146; 62/45; 122/510

[56] References Cited
UNITED STATES PATENTS 2,890,009   6/1959   Chapellier..................... 248/DIG. 1
3,767,150   10/1973  Tabata............................... 248/146
3,768,765   10/1973  Breckenridge..................... 248/146

FOREIGN PATENTS OR APPLICATIONS 662,411    4/1963   Canada................................ 62/45

Primary Examiner—Marion Parsons, Jr.
Attorney, Agent, or Firm—Bessie A. Lepper

[57] ABSTRACT

A cryogenic support system capable of operating in two modes: one being an isothermal mode during which time the cryogenic assembly being supported is subjected to stress, mechanical shock, acceleration or the like; the other being a "steady state" mode in which a rugged support is replaced by a less rugged arrangement exhibiting a very low thermal conductance.

6 Claims, 3 Drawing Figures

PATENTED JUN 4 1974

3,814,361

SHEET 1 OF 2

DUAL-MODE CRYOGENIC SUPPORT SYSTEM

This invention relates to a support system and more particularly to a cryogenic support system adapted to operate in two different modes. The first of these modes provides a mechanically rugged configuration with attendant moderate to high thermal conductance and the second of these modes provides a less rugged configuration with very low thermal conductance.

In using a cryogen for a refrigerant it is often necessary to be able to store the cryogen over extended periods of time. This in turn means that the vessel containing the cryogen, such as liquid helium, must be supported in a manner to minimize heat leak into the cryogen. While suitable support systems can be constructed to minimize heat flow into a storage vessel which is designed continuously to remain stationary, such support systems can not tolerate mechanical shocks such as are encountered when the storage vessel is moved under relatively rough conditions, is launched into space or is subjected to other relatively rough treatment.

There is therefore a need for a support system which can provide mechanical ruggedness when needed as well as very low thermal conductivity when the cryogenic apparatus it supports is at rest.

It is therefore a primary object of this invention to provide an improved support system for cryogenic use, the support system being capable of operating in two different modes. It is another object to provide a support system of the character described which has sufficient ruggedness to permit the cryogenic assembly which it supports to be subjected to mechanical shock or acceleration during isothermal conditions. Yet another object is to provide such a support system which exhibits very low thermal conductance between ambient conditions and the cryogenic assembly when such shocks or accelerations are no longer imposed upon the system. A further object of this invention is to provide a support system of the character described which is capable of precise mechanical positioning of the components making up the support system. Other objects of the invention will in part be obvious and will in part be apparent hereinafter.

The cryogenic support system of this invention is formed of two shunt elements, a first one of which is fixed to the cryogenic assembly to be supported and a second one of which is fixed to a suitable primary outer support. These shunt elements are engageable through annular conical surfaces. Their engagement is effected during isothermal conditions, that is when the cryogenic assembly is being subjected to mechanical shock, acceleration or the like and when moderate to high thermal conductance from the ambient surroundings can be tolerated. In this engaged position the two shunt elements provide a rugged support system capable of sustaining significant mechanical loading. However, when the assembly reaches a steady state, that is it is free from any shock, acceleration or the like, the first shunt element is cooled, it contracts and breaks contact with the second shunt element by moving axially. The mechanical load path is thereby transferred to a thin, low thermal conductivity tubing which restrains the first shunt element laterally while permitting it free axial motion. In one embodiment, means are additionally provided to support an intermediate member such as a radiation shielding.

In a typical application of the support system of this invention, three or more of the supports may be spaced equidistant from each other in a radial fashion around the periphery of a crylindical vessel, a radiatively cooled inner member, or refrigerator maintained or operating at cryogenic temperatures. This achieves accurate radial positioning of the vessel or refrigerator being supported.

The invention accordingly comprises the features of construction, combination of elements, and arrangement of parts which will be exemplified in the constructions hereinafter set forth, and the scope of the invention will be indicated in the claims.

Figure 2:
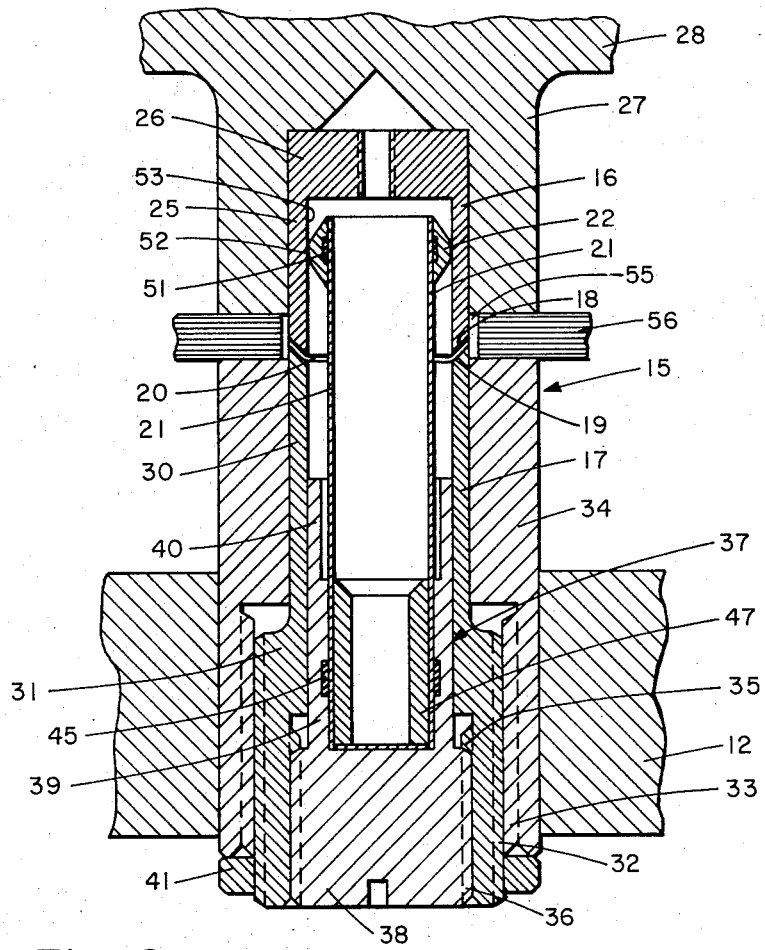
Figure 3:
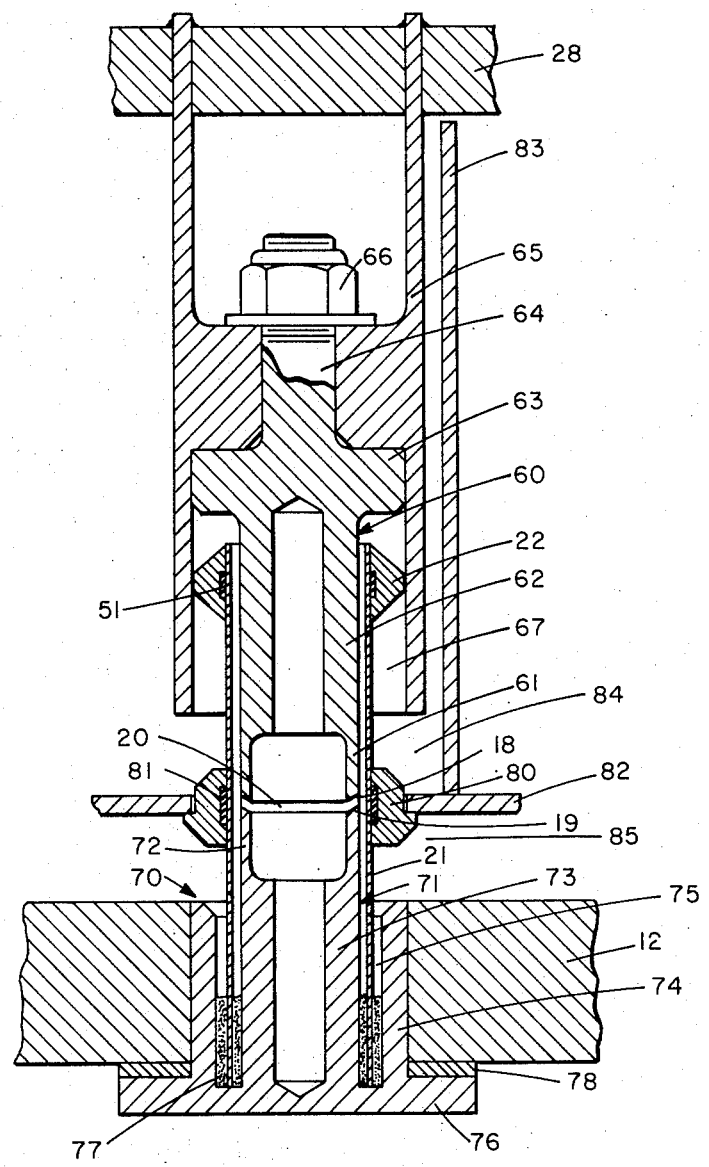

For a fuller understanding of the nature and objects of this invention, reference should be had to the following detailed description taken in connection with the accompanying drawings in which FIG. 1 is a cross section through an overall support structure suitable for holding a vessel containing a liquid cryogen and employing three of the support systems of this invention;

FIG. 2 is a cross section of one embodiment of the support system of this invention; and FIG. 3 is a cross section of another embodiment of the support system of this invention which provides means to support an intermediate member such as a radiation shield.

FIG. 1 is a much simplified cross section showing three support systems constructed in accordance with the basic principle of this invention used in a support structure for holding a vessel containing a cryogen. In FIG. 1 a vessel 10 containing a liquid cryogen 11 (e.g., liquid helium) is supported by main outer support 12 through three support systems 13, 14, 15. It will, of course, be appreciated that such components as insulation, radiation shielding, and the like are omitted from FIG. 1 since the drawing is provided only to illustrate the use of the support systems. In FIG. 1, support system 15 is shown in simplified cross sectional detail to comprise a first annular fixed shunt element 16 and a second annular adjustable shunt element 17. The shunt elements are engageable along conical annular surfaces 18 and 19. These shunt elements are shown in FIG. 1 to be in their disengaged position and to define a insulating gap 20 between them. In this condition the load is borne by low thermal conductivity tubing 21 which has an external annular support ring 22 adapted to make a sliding, essentially line contact with the first shunt element 16. Thus in its axial motion, the first shunt element which is cooled by the liquid cryogen 11 is restrained from lateral motion to maintain axial alignment of the support systems.

FIG. 2 is a detailed cross section of one embodiment of the support system such as shown in FIG. 1 wherein like reference numerals are used to refer to like components. In the embodiment of FIG. 2, the first, or fixed, shunt element 16 is formed as an annular tube 25 closed on one end by an end member 26 and terminating at the other engaging end in the conical or tappered surface 18. This first fixed shunt element, which may be machined in one piece, is mounted in an inner support extension 27 attached to or integral with an inner support ring 28 such as might be suitable for holding cryogen vessel 10 (FIG. 1).

The second, or adjustable, shunt element 17 is formed as a tube having a relatively thin-walled section 30, which terminates in its conical annular surface 19, and a thicker-walled attachment/adjustment section 31. This latter attachment/adjustment section 31 is threaded externally at 32 to engage threads at 33 along the inner wall of an outer support member 34 which is shown to be mounted in outer support ring 12.

The inner threads 35 of the attachment/adjustment section 31 of the second shunt element are adapted to engage threads 36 on the surface of a section of a metal tube mount 37 formed in three sections: a plug section 38 which is threaded on its surface, a tube mounting section 39, and a thin-walled bearing and alignment section 40. A locking nut 41 is provided to retain the tube mounting member in the outer support member 34.

The low thermal conductance tube 21 which serves as a thermal isolating member and which is typically formed of a nonmetallic material such as a resin-filled glass fiber material, is adhered to the tube mounting section 39 of the tube mount through the use of a suitable adhesive 45 such as an epoxy resin. The tube is open at both ends. An annular metal shaping plug 47 is inserted into one end of tube 21 to maintain its circular configuration and to ensure it contact and adherence to the tube mount.

Around the protruding end of tube 21 is mounted the metal contact ring 22 which is affixed to the outer surface of the tube through an adhesive 51 (e.g., epoxy resin). The mounting ring is tapered on both sides toward its periphery so as to form a very narrow contacting surface 52 approaching a narrow line in width. This narrow line contacting surface makes a sliding fit with the internal wall 53 of the first fixed shunt element, thus permitting this shunt element to move when the cryogenic assembly contracts upon cooling to form insulating gap 20. The shunt element is thereby free to move radially along the axis of the support system but is restrained from any lateral movement so that the alignment of the entire support structure is maintained.

As shown in FIG. 2, the gross spacing 55 between the two shunt elements may be filled with multilayered insulation 56 and it is, of course, within the scope of this invention to further insulate at least that end of the support system which houses the first colder shunt element.

In operation, when the support system is in the isothermal mode (subject to shock, acceleration, moving or the like) the mechanical loads between one end of the support system and the other end are carried by the engaged tapered shunt components 16 and 17. The degree of engagement in this mode is controlled and adjusted by the extent to which tapered surface 19 of the second adjustable shunt element 17 is forced against the mating tapered surface 18 of the first fixed shunt element 16. The desired degree of force is, of course, applied by turning the threaded attachment/adjustment section 31 of the second shunt element within outer support member 34.

In this isothermal operating mode, the insulating gap is, of course, completely closed and the mechanical load path under this condition can be traced through main support structure 12, outer support member 34, second shunt element 17, first shunt element 16, inner support extension 27 and inner support ring 28.

When the assembly has attained what may be termed its "steady state" position and does not need to be supported to withstand shock, moving, acceleration or the like, the support system is transformed into one of very low thermal conductivity. As the cryogenic assembly is cooled, it experiences thermal contraction which in effect moves element 28 away from element 12, and disengages shunt element 16 from shunt element 17, the degree of cooling required to effect such disengagement having been predetermined by the adjustment of shunt element 17 as previously explained. Therefore, at a predetermined temperature, insulation gap 20 is formed and the mechanical load path shifts from the shunt elements to essentially the low thermal conductivity tube 21. With this shifting of the load path comes also a shifting of the heat leak path. By restricting the contacting surface 52 of support ring 22 and by using a tubing of low thermal conductance, the heat leaked into the cryogen-containing vessel or other cryogenic device is minimized when thermal isolation is required.

FIG. 3 illustrates another embodiment of the support system of this invention wherein provision is made for supporting an intermediate member, such as radiation shielding, by the low conductance support tube. The addition of an intermediate supporting collar necessitates a minor rearrangement of the various components of the support system, but the basic structure and mode of operation remain the same as for the embodiment of FIG. 2.

In the embodiment of FIG. 3 the first fixed shunt element 60 is formed of four sections, but may be machined as one integral element. The engaging section 61 which terminates in the conical surface 18 is formed as a relatively thin-walled tube; and adjacent this section is a thicker-walled cylindrical section 62 joined to a plug section 63 which in turn terminates in a threaded screw section 64. The first shunt element is affixed to inner support ring 28 through an inner shunt support 65 to which the first shunt element is affixed through screw 64 and nut 66. This inner shunt support 65 is configured to allow access to screw 64, to permit attachment to the main inner support 28 and to define a chamber 67 into which the low conductance tube 21 and its upper support ring 22 fit. In this arrangement, the fixed shunt element, in effect, includes the inner shunt support 65 by virtue of this connection.

The second shunt element 70 is made up of an inner cylindrical member 71, comprising a thin-walled engaging section 72 terminating in conical surface 19 and a thicker-walled section 73 integral therewith, and an outer concentric cylindrical member 74 defining an annular spacing 75 with inner cylindrical member 71. The two concentric cylindrical members 71 and 74 are joined, and spacing 75 is sealed off by means of end plates 76. The low thermal conductance tube is mounted concentrically with the cylindrical members 71 and 74 by fixing it with a suitable adhesive 77 in annular spacing 75. One or more shims 78 are placed between plate 76 and main support structure 12 as means to adjust the axial position of the second shunt element relative to the first shunt element.

An intermediate supporting collar 80 is affixed by means of adhesive 81 to the outer wall of low conductance support tube 21 at substantially that level where insulation gap 20 occurs. This intermediate support collar 80 is configured to support a guard vessel or radiation shielding 82. Optionally, the radiation shielding may extend around the colder end of the support system as shown by shielding 83. Suitable insulating may be used in areas 84 and 85.

The operation of the embodiment of FIG. 3 is the same as that of FIG. 2. Although the embodiment of FIG. 3 does not include any screw means to adjust the engaging force between the tapered surfaces of the two shunt elements this type of adjustment is achieved in this embodiment by the choice of the number and character of shims 78. It will be seen that because the fixed shunt element includes the inner shunt support 65, the contact ring 22 serves to restrict lateral movement of the first shunt element in the same manner as in the embodiment of FIG. 1. In the isothermal mode the mechanical load path is through the shunt elements and their attendant supporting and supported components. With the establishment of the insulation gap 20, the load path is shifted to the low thermal conductance tube 21 to attain the desired low thermal conductance path.

Thus there is provided a cryogenic support system which operates effectively in two distinctly different modes to provide both a rugged support and a very low thermal conductance when needed.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:

1. A support system suitable for incorporation into a cryogenic support structure to provide two modes of operation, comprising in combination
   a. a first shunt element fixed through first support means to a cryogenic assembly to be supported and terminating in a first tapered annular surface;
   b. a second adjustable shunt element fixed to second support means and terminating in a second tapered annular surface engageable with said first tapered annular surface;
   c. a low thermal conductivity insulating support tube fixed to said second shunt element, extending through said second shunt element into said first shunt element, and having an external contact ring adapted to make sliding contact with and restrain the lateral motion of said first shunt element; and
   d. tube positioning means adapted to fix said tube to said second shunt element and to hold it in axial alignment with said shunt elements.

2. A support system in accordance with claim 1 wherein said second shunt element comprises a relatively thin-walled section which terminates in said tapered surface and a thicker-walled annular section which has both internal and external threads, said internal threads being engageable with threads in said tube positioning means and said external threads being engageable with threads in a support member forming part of said second support means thereby providing means to adjust the force with which said second adjustable shunt elements engages said first fixed element when said support system is in a isothermal mode of operation.

3. A support system in accordance with claim 2 including a shaping plug within said tube at the end where it is fixed to said second shunt element.

4. A support system in accordance with claim 1 wherein said first shunt element comprises a thin-walled section terminating in said first tapered surface, a thicker-walled section, a plug section and a screw section and inner shunt support means surrounding said thicker-walled, plug and screw sections thereby to define with said thicker-walled section a chamber into which said tube extends.

5. A support system in accordance with claim 4 including a support collar fixed to the external wall of said tube intermediate the length of said tube.

6. A support system in accordance with claim 4 wherein said second shunt element comprises
   1. a thin-walled section terminating in said second tapered surface,
   2. an inner thicker-walled section integral with said thin-walled section,
   3. an outer annular member concentric with said inner thicker-walled section and defining therewith an annular spacing adapted to seat and fix said tube therein;
   4. an end plate sealing off said annular spacing and forming an annular extension beyond said outer annular member, and
   5. shim means engaging said annular extension and being adapted for engagement with said second support means thereby providing means to adjust the force with which said second adjustable shunt element engages said first fixed element when said support system is in an isothermal mode of operation.

* * * * *